United States Patent
So

(10) Patent No.: US 8,111,493 B2
(45) Date of Patent: *Feb. 7, 2012

(54) CURRENT LIMIT DETECTOR

(75) Inventor: John So, Fremont, CA (US)

(73) Assignee: Advanced Analogic Technologies, Inc., Santa Clara, CA (US)

(*) Notice: Subject to any disclaimer, the term of this patent is extended or adjusted under 35 U.S.C. 154(b) by 45 days.

This patent is subject to a terminal disclaimer.

(21) Appl. No.: 12/401,532

(22) Filed: Mar. 10, 2009

(65) Prior Publication Data

US 2009/0225484 A1 Sep. 10, 2009

Related U.S. Application Data

(63) Continuation of application No. 11/752,130, filed on May 22, 2007, now Pat. No. 7,532,448.

(60) Provisional application No. 60/829,307, filed on Oct. 13, 2006, provisional application No. 60/912,912, filed on Apr. 19, 2007.

(51) Int. Cl.
   *H02H 3/08* (2006.01)

(52) U.S. Cl. ...................... 361/93.1; 361/93.9

(58) Field of Classification Search .............. 361/93.1, 361/93.3, 93.9
   See application file for complete search history.

(56) References Cited

U.S. PATENT DOCUMENTS

| | | | |
|---|---|---|---|
| 3,534,353 A * | 10/1970 | Calkin et al. ................. | 340/664 |
| 3,859,591 A | 1/1975 | Saunders | |
| 3,892,929 A | 7/1975 | Shylo | |
| 4,649,455 A * | 3/1987 | Scott ........................... | 361/93.3 |
| 4,783,137 A | 11/1988 | Kosman et al. | |
| 4,788,620 A | 11/1988 | Scott | |
| 4,910,455 A | 3/1990 | Nadd | |
| 5,282,125 A | 1/1994 | Dhyanchand et al. | |
| 5,331,314 A * | 7/1994 | Koch ........................... | 340/661 |
| 5,506,493 A | 4/1996 | Stengel | |
| 5,955,915 A | 9/1999 | Edwards | |
| 6,130,813 A | 10/2000 | Kates | |
| 6,163,708 A | 12/2000 | Groe | |
| 6,170,241 B1 | 1/2001 | Shibilski et al. | |
| 6,407,894 B1 * | 6/2002 | Bilac et al. ..................... | 361/44 |
| 6,617,833 B1 | 9/2003 | Xi | |

(Continued)

FOREIGN PATENT DOCUMENTS

| TW | 200406966 A | 5/2004 |
|---|---|---|
| TW | 200629718 A | 8/2006 |

OTHER PUBLICATIONS

PCT International Search Report and Written Opinion dated Mar. 28, 2008 for International Application No. PCT/US07/81276.

(Continued)

*Primary Examiner* — Rexford Barnie
*Assistant Examiner* — Christopher Clark
(74) *Attorney, Agent, or Firm* — Sheppard Mullin Richter & Hampton LLP

(57) ABSTRACT

Devices, such as mobile devices, may be exposed to short circuit and output overload events. To protect against such events, mobile devices typically include current limit circuits. Some current limit circuits may involve user programmable function. User programmable function may need accurate current limit detectors. One approach to improving resolution and accuracy of current limit detectors using a single resistive device is to magnify the operating current range. Various embodiments of the present invention include devices and methods for detecting pre-programmed current limits.

34 Claims, 10 Drawing Sheets

U.S. PATENT DOCUMENTS

| | | | |
|---|---|---|---|
| 6,636,025 B1 | 10/2003 | Irissou | |
| 6,639,778 B2 | 10/2003 | Smith | |
| 6,657,906 B2 | 12/2003 | Martin | |
| 6,762,917 B1 | 7/2004 | Verbiest et al. | |
| 6,807,040 B2 | 10/2004 | Ivanov et al. | |
| 6,809,678 B2 | 10/2004 | Vera et al. | |
| 6,859,000 B2 * | 2/2005 | Kessler et al. | 318/400.06 |
| 6,947,272 B2 * | 9/2005 | Daniels et al. | 361/93.9 |
| 7,181,954 B2 | 2/2007 | Horie | |
| 7,200,373 B2 | 4/2007 | Dornbusch | |
| 7,248,026 B2 | 7/2007 | Ritter | |
| 7,253,997 B2 * | 8/2007 | Balakrishnan et al. | 361/18 |
| 7,268,992 B2 * | 9/2007 | Hallak et al. | 361/93.7 |
| 7,342,761 B2 * | 3/2008 | Covault | 361/93.1 |
| 7,362,191 B2 | 4/2008 | Chen et al. | |
| 7,459,891 B2 | 12/2008 | Al-Shyoukh et al. | |
| 7,573,689 B2 * | 8/2009 | Hojo | 361/93.1 |
| 2002/0030475 A1 | 3/2002 | D'Angelo et al. | |
| 2002/0181180 A1 * | 12/2002 | Ivanov et al. | 361/93.9 |
| 2003/0088800 A1 * | 5/2003 | Cai | 713/320 |
| 2003/0095368 A1 | 5/2003 | Daniels et al. | |
| 2003/0099137 A1 * | 5/2003 | Martin | 365/198 |
| 2005/0152164 A1 | 7/2005 | Balakrishnan et al. | |
| 2005/0190515 A1 * | 9/2005 | Hallak et al. | 361/90 |
| 2006/0162427 A1 * | 7/2006 | Horie | 73/40.7 |
| 2007/0008795 A1 | 1/2007 | Tsukada | |
| 2008/0071489 A1 * | 3/2008 | Wissel | 702/79 |

OTHER PUBLICATIONS

PCT International Search Report and Written Opinion dated May 5, 2008 for International Application No. PCT/US07/81300.

PCT International Search Report and Written Opinion dated May 7, 2008 for International Application No. PCT/US07/81292.

PCT International Search Report and Written Opinion dated May 7, 2008 for International Application No. PCT/US07/81563.

*Start-Up Current-Limiters for Supercapacitors in PDAs and Other Portable Devices*; cap-XX Application Note No. 1002; Feb. 2002; pp. 1-14; Revision 2.1; cap-XX Pty. Ltd.; Lane Cove, NSW, Australia.

Gu, Wek, *Improve that Mobile Phone Camera; Replace the Anemic LED Flash with a Xenon Flashlamp and a Tiny Photoflash Capacitor Charger*; Linear Technology Magazine; Dec. 2006; pp. 14-19; vol. XVI, No. 4.

AAT4529 PCMCIA *Current Limit Interface*, Analogic Tech; Apr. 2006; pp. 1-7.

AND8140/D:SMART HotPlug Current Limit Function; ON Semiconductor; Nov. 2004-Rev.1.

Notice of Allowance mailed Oct. 6, 2009 from U.S. Appl. No. 11/752,049, filed May 22, 2007.

Notice of Allowance mailed Jul. 9, 2010 from U.S. Appl. No. 11/752,101, filed May 22, 2007.

Supplemental Search Report mailed Nov. 15, 2011 from European Patent Application No. 07844244.9 filed Oct. 12, 2007.

Supplemental Search Report mailed Nov. 15, 2011 from European Patent Application No. 07854010.1 filed Oct. 12, 2007.

\* cited by examiner

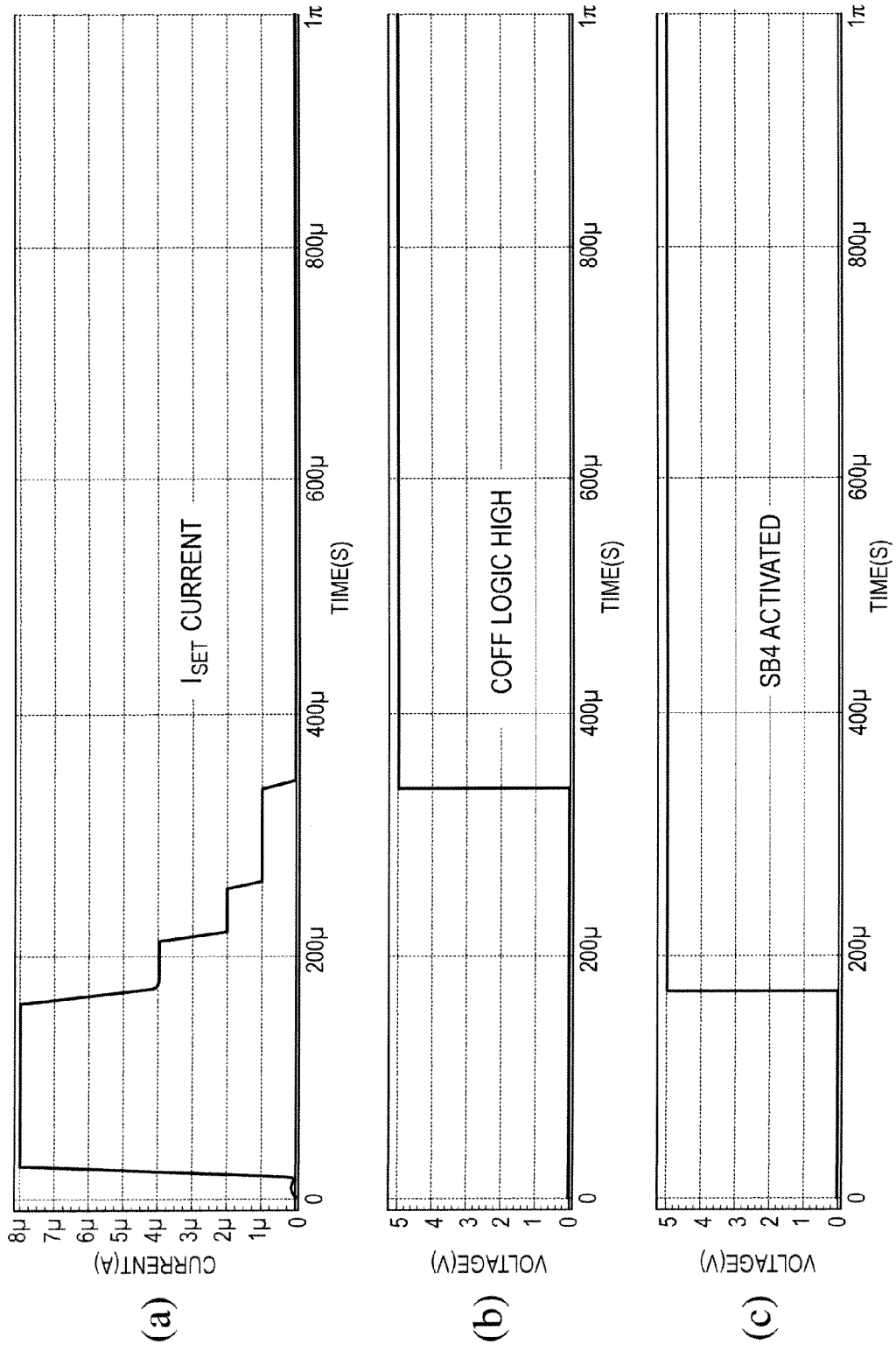
FIG. 5 (Part 1)

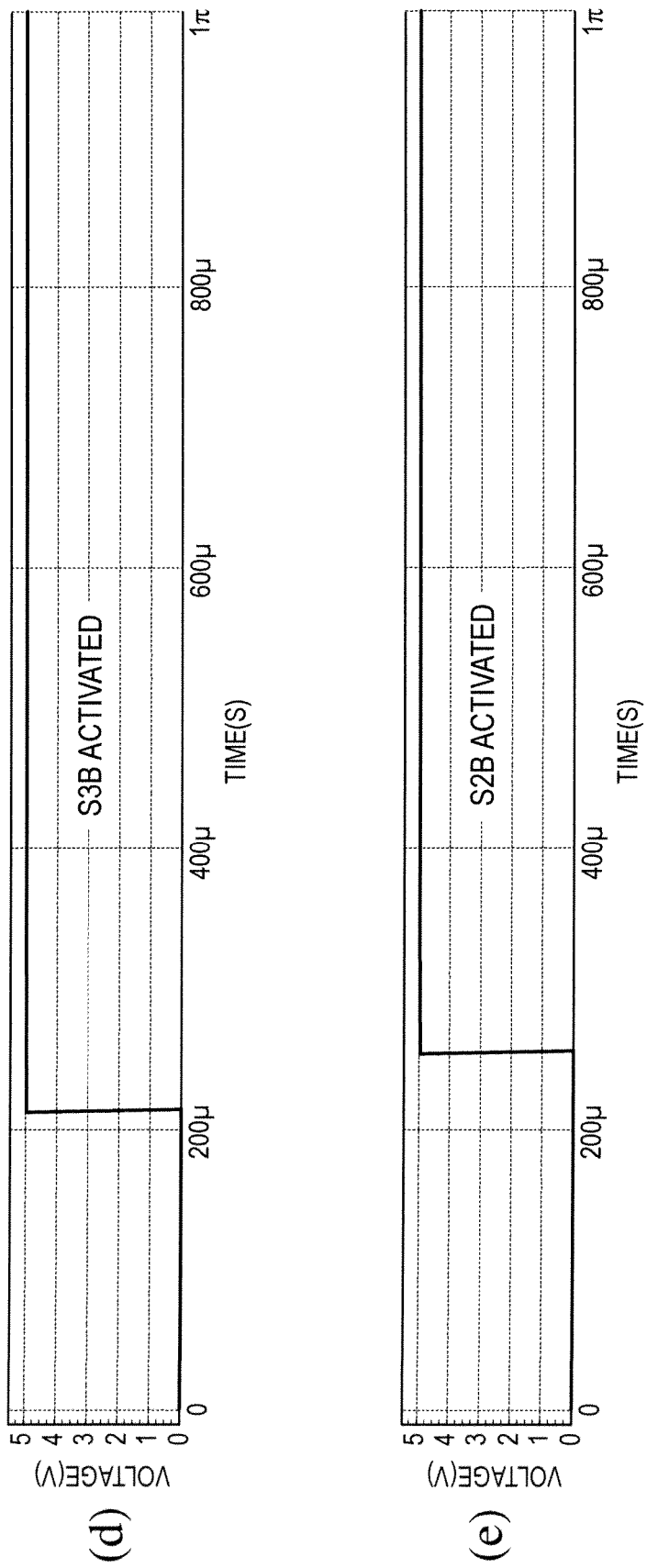
FIG. 5 (Part 2)

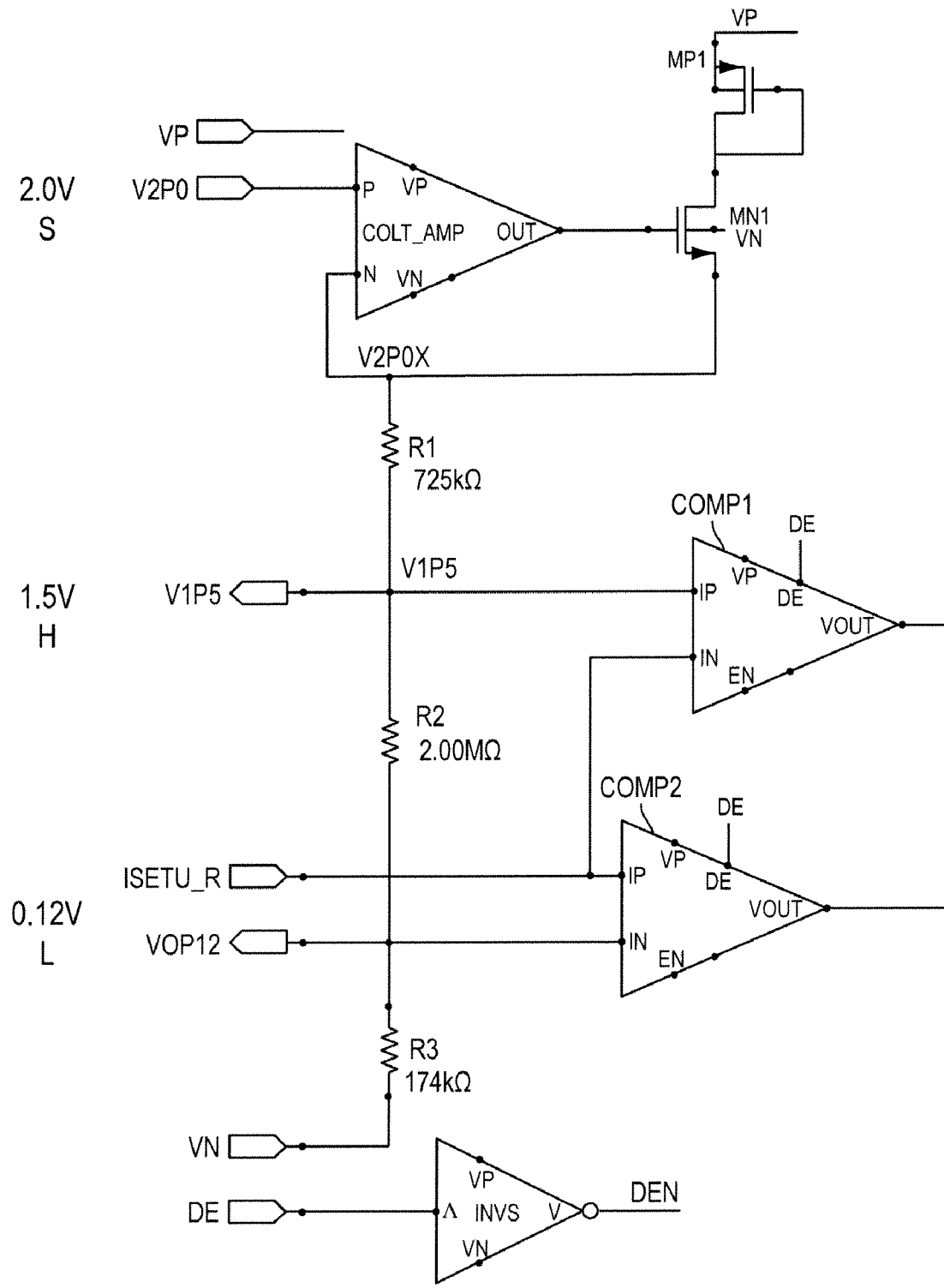
FIG. 6 (Part 1)

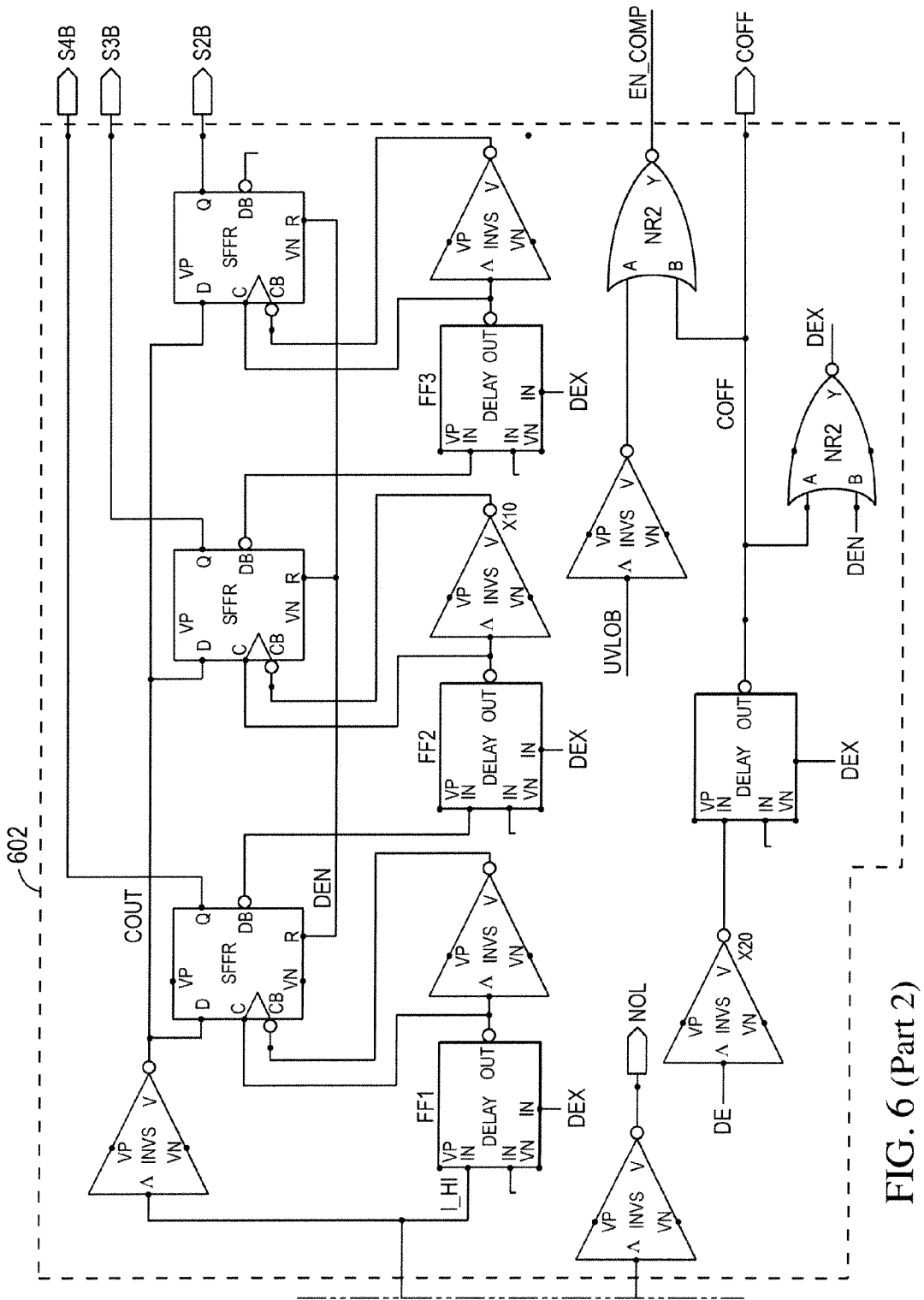
FIG. 6 (Part 2)

CURRENT LIMIT DETECTOR

REFERENCE TO EARLIER APPLICATION

This application is a continuation of, and incorporates by reference, U.S. Nonprovisional application, application Ser. No. 11/752,130, filed May 22, 2007, titled "Current Limit Detector," which claims the benefit of and incorporates by reference U.S. Provisional Applications, Ser. No. 60/829,307, filed Oct. 13, 2006, titled "Current Limit Detector" and Ser. No. 60/912,912, filed Apr. 19, 2007, titled "Current Limit Detector."

FIELD OF THE INVENTION

The present invention relates generally to power management in mobile devices and more specifically to current limit detectors with an application in devices such as load switches.

BACKGROUND

Current limiting is the practice of imposing an upper limit on the current that may be delivered to a load. The typical purpose of current limiting is to protect the circuit up or downstream from harmful effects due to, for example, a short circuit. In load switch applications used in power sources and adapters, current may be limited below a load switch setting. Load switch applications include driving a power line of a universal serial bus (USB) connector to various peripheral devices. Examples of load switch devices include current limited load switch devices produced by Advanced Analogic Technologies, Inc. (Sunnyvale, Calif.) as integrated circuits (ICs) designed to protect external power ports and to extend battery life in portable electronic products. Such load switch devices operate with an integrated current limiting circuit that protects, for example, the input supply against large changes in load current which could otherwise cause the supply to fall out of regulation.

As current limited devices, load switches are able to draw current up to the load switch setting. If the current exceeds the load switch setting, the current limiting circuit in the load switch limits the current flowing through the load switch. Typically, a resistor (either external or internal to the IC) is used to set the load switch current limits. Typically, within an operating voltage range of the load switch, a single current limit is set based on the resistive value chosen by the designer. One disadvantage of using a single resistor for a wide operating voltage range (and thus a wide range of load current) is loss of accuracy. This loss may occur, because the resistive value and tolerance typically determine the level of granularity of current increments detectable.

For example, as shown in FIG. 1, as part of system design, a user selects a resistor having a resistive value, $R_{SET}$. The user also defines a current limit to be associated with the resistive value, thereby establishing a one-to-one correspondence between the two parameters. The current limit is arbitrarily selectable by the designer. In this example, the designer has defined the current limit of 100 mA to correspond to a resistive value of 100Ω, and the current limit of 1 A to correspond to 1 kΩ. Within an operating voltage range of 0 to 1 V, the current limit cannot be set with the 1 kΩ resistor at a resolution below 1 A. For a resolution of the current limit below 1 A, a resistive value below 1 kΩ needs to be selected during system design. However, the operating voltage range must then also be limited accordingly. For example, in order to obtain a current limit of 140 mA, the resistive value needs to be decreased to 140Ω. One approach to changing the resistive value is to replace the resistor. Even with the different resistive value, the resolution may be low, such as due to resistor tolerance (e.g., 5%, 10% or more). When the resistor is replaced, the operating voltage changes as well. In this example, the operating voltage decreases to 0 to 0.14 V. In order to improve current limit control, more current limit detection with better resolution and accuracy is needed.

Therefore, there is a need for improved design of current limit detectors. One desired aspect of such design might be to substantially increase the accuracy and resolution obtainable using a particular resistive value.

SUMMARY

The present invention is based, in part, on the foregoing observations and in accordance with its purpose various embodiments of the invention include devices and methods for detecting current limits. Generally, the various implementations of a device for detecting current limits can use a single resistive device but may compensate in other ways for its inherent problems (e.g., limited operating voltage range). Others can use delay elements in a configuration suitable to maintain a sequence of one or more steps, up or down, for limiting the current and to prevent race conditions. As a possible alternative to the aforementioned designs, which may be inflexible, of limited use, or both, the proposed new implementations use an integrated circuit (IC) or a number of discrete components that are typically more flexible and efficient in detecting current limitation. To illustrate, a number of embodiments are explained in more detail below.

According to one embodiment, a device for detecting current limits comprises: a plurality of current paths, a resistive device, a high reference voltage terminal, and a high-level comparator having inputs and an output. Each current path is adapted to conduct current and at least one of the current paths includes a current switch operable to interrupt current conduction therethrough. Collectively, the currents flowing through the plurality of current paths combine to produce a sum of currents. The resistive device is of a predetermined resistive value and is coupled to the plurality of current paths. It is adapted to conduct the sum of currents which produces a voltage drop across it. The predetermined resistive value is set to establish a relationship between the sum of currents and a current limit defined by a user. The high reference voltage terminal is operative to supply a high threshold voltage. One of the inputs of the high-level comparator is operative to receive the high threshold voltage and another one of the inputs is operatively coupled to the resistive device. The high-level comparator produces at the output a signal responsive to a comparison between the voltage drop and the high threshold voltage.

In this embodiment, such output may be adapted to operate the current switch to step-wise detect the user-defined current limit associated with the sum of currents. Step-wise may include stepping up or down in a step fashion. Such device may further include a low reference voltage terminal operative to supply a low threshold voltage, and a low-level comparator. One of the inputs of the low-level comparator may receive the low threshold voltage and another one of the inputs may be operatively coupled to the resistive device. The low-level comparator has an output which produces a signal responsive to a comparison between the voltage drop and the low threshold voltage. Such output signal may be adapted to step-wise interrupt current conduction on one or more of the plurality of current paths. The device may also include current OFF logic operative to detect that the device is dormant and to turn OFF substantially all bias currents. Moreover, the device may include delay elements operatively coupled in series and operative, serially, to maintain a sequence of states. The length of the sequence may be equal to the number of delay elements. At least one of the delay elements may be adapted to produce an output for causing a change to the state of a subsequent one of the delay elements in the series. Each state defines which of the one or more transistors are to interrupt current conduction through their respective current paths. The delay elements may include flip-flop registers.

According to another embodiment, a method for detecting current limits comprises: comparing a voltage drop and a high threshold voltage. In such method, the voltage drop is a product of a plurality of currents flowing through a plurality of currents paths and combining into a sum of currents flowing through a resistive device. The resistive device has a resistive value set to establish a relationship between the sum of currents and a current limit defined by a user. Each current path is adapted to conduct current and at least one current path includes a current switch operable to interrupt current conduction therethrough. Based on this comparison, the method may further include establishing the relationship between the sum of currents and the user-defined current limit by operating one or more of the current switches step-wise.

The method may also include comparing the voltage drop and a low threshold voltage. The interrupting of current conduction of one or more of the current switches step-wise may be in response to comparing the voltage drop and one or both of the high and low threshold voltages.

The method may also include turning OFF substantially all bias currents. Such turning OFF may include detecting that the device is dormant and activating current OFF logic. Moreover, the method may include maintaining a sequence of states in a plurality of delay elements operatively coupled in series, and step-wise controlling the current limit detection. A particular delay element may have a particular state and may be responsive to an output of the delay element preceding it in the series. The step-wise controlling of the current limit detection may include changing the particular state of the particular delay element in response to a change in the output of the delay element preceding it in the series. Changing the particular state of the particular delay element may include serially clocking the sequence one step forward.

According to yet another embodiment, an apparatus for detecting current limits comprises: a current limit detector and a current limit controller. The current limit detector is operative to detect a current and includes a plurality of current paths, a resistive device, a high reference voltage terminal, and a high-level comparator as substantially described above with reference to one embodiment of a device for detecting current limits. The current limit controller is operatively coupled to the current limit detector and can step-wise limit an output current so as not to exceed a detected user-defined current limit. In such apparatus, the step-wise limiting the output current may include outputting, at the current controller, a sequence of control signals. Each control signal may be associated with one step in the step-wise limitation of the output current. Such apparatus may also include a current limit portion operatively coupled to the current limit detector and to the current limit controller. It may be operative to regulate the output current in response to the sequence of control signals received from the current limit controller. The apparatus may further include a charge storage device adapted to cooperate with the current limit controller and to provide an energy reservoir. This reservoir is capable of supplying burst power.

In these embodiments, various possible attributes may be present. The current switch may include a transistor. The comparison between the voltage drop and the high threshold voltage may include determining whether the voltage drop is above the high threshold voltage. The comparison between the voltage drop and the low threshold voltage may include determining whether the voltage drop is below the low threshold voltage. Each current path may conduct current of an amount specific to it, and such amount may be based on a scale of the respective current switch. The resistive device may include a resistor. The delay elements may include flip-flop registers. The device for detecting current limits may be embodied in an IC or as a functional block in the IC. Such IC may also be adapted for use in a mobile device In various embodiments, a system may comprise a plurality of current paths each of which coupled to an input path, wherein each of the plurality of current paths are adapted to conduct current. The system may further comprise a current switch, an input path, a resistive device, a low reference voltage terminal, and a low level comparator. The current switch may be adapted to interrupt current conduction through at least one of the plurality of current paths. The input path may be configured to receive current not interrupted by the current switch from the plurality of current paths. The resistive device may be of a predetermined resistive value coupled to the input path and may be adapted to conduct the current not interrupted by the current switch from the plurality of current paths to produce a voltage drop. The low reference voltage terminal may be operative to supply a low threshold voltage. The low-level comparator may be adapted to receive the low threshold voltage from the low reference voltage terminal and the current not interrupted by the current switch from the plurality of current paths from the input path, the low-level comparator may be further adapted to produce a signal, the signal being responsive to a comparison between the voltage drop and the low threshold voltage to operate the current switch.

The current switch may include a transistor and the resistive device may include a resistor. Further, an amount of the current being conducted on each current path may be based on a scale of at least one other current switch. The comparison between the voltage drop and the low threshold voltage may include determining whether the voltage drop is lower than the low threshold voltage.

The system may further comprise OFF logic operative to detect that the system is dormant and to turn OFF substantially all bias currents. The system may also further comprise delay elements operatively coupled in series and may be operative, serially, to maintain a sequence of states, each state defining which of the one or more current switches are to interrupt current conduction through their respective current paths. The sequence of states may be of a length equal to a number of delay elements, at least one of the delay elements being adapted to produce an output for causing a change to the state of a subsequent one of the delay elements in the series. The delay elements may include flip-flop registers.

Each current path may be further adapted to conduct current of a specific amount. The system may be embodied in an integrated circuit (IC) or as a functional block in the IC. The IC may be adapted for use in a mobile device.

The system may further comprise a high reference voltage terminal and a high-level comparator. The high reference voltage terminal may be operative to supply a high threshold voltage. The high-level comparator may include at least two inputs and an output, one of the two inputs being operative to receive the high threshold voltage and the other one of the two inputs adapted to receive the current not interrupted by the current switch from the plurality of current paths from the input path, the high-level comparator producing at the output a signal responsive to a comparison between the voltage drop and the high threshold voltage. In some embodiments, the comparison between the voltage drop and the high threshold voltage includes may be determined based on whether the voltage drop is above the high threshold voltage.

In various embodiments, a method comprises combining a plurality of current flows, producing a voltage drop from the combined current flows and a predetermined impedance, comparing a high threshold voltage and the voltage drop, and controlling at least one current flow of the plurality of current flows based on the comparison.

A system may comprise a current limit detector and a current limit controller. The current limit detector may comprise a plurality of current paths, a current switch, an input path, a resistive device, a high reference voltage terminal, and a high-level comparator. The plurality of current paths may each of which coupled to an input path, wherein each of the plurality of current paths may be adapted to conduct current. The current switch may be adapted to interrupt current conduction through at least one of the plurality of current paths. The input path may be configured to receive current not interrupted by the current switch from the plurality of current paths. The resistive device of a predetermined resistive value may be coupled to the input path and may be adapted to conduct the current not interrupted by the current switch from the plurality of current paths to produce a voltage drop. The high reference voltage terminal may be operative to supply a high threshold voltage. The high-level comparator may be adapted to receive the high threshold voltage from the high reference voltage terminal and the current not interrupted by the current switch from the plurality of current paths from the input path, the high-level comparator may be further adapted to produce a signal, the signal being responsive to a comparison between the voltage drop and the high threshold voltage to operate the current switch. The current limit controller may be operatively coupled to the current limit detector and may be operative to step-wise limit an output current based, at least in part, on the signal of the high-level comparator.

These and other embodiments, features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification, illustrate various aspects of the invention and, together with the description, serve to explain its principles. Wherever convenient, the same reference numbers will be used throughout the drawings to refer to the same or like elements.

FIG. 5 is an exemplary graph of current output over time with $R_{SET}$ of 1 MΩ as current switches are successively activated, according to one embodiment of the present invention.

FIG. 6 illustrates circuit details of a current limit detector, according to one embodiment of the present invention.

DETAILED DESCRIPTION

Devices, such as mobile devices, may be exposed to short circuit and output overload events. It may therefore be advantageous to protect these devices with circuitry capable of detecting current limits and to limit their supply current in response to such detection.

Accordingly, various embodiments of the invention include devices and methods for detecting current limits. Such devices and methods preferably use a single resistive device for detecting the current limit.

Figure 1:
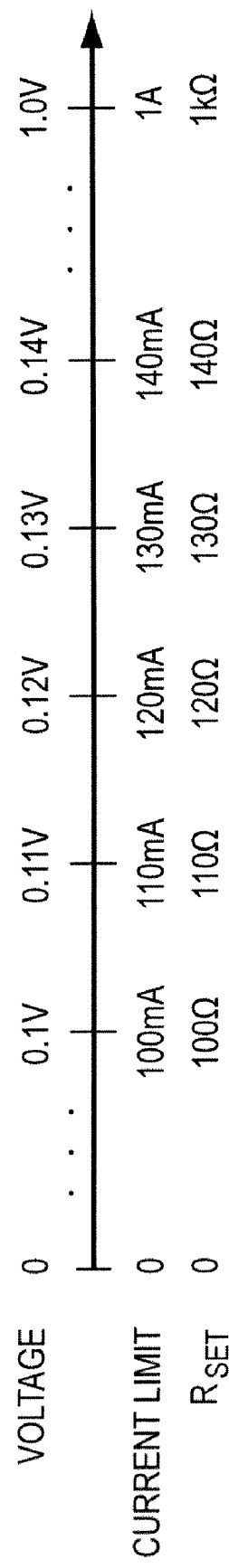
FIG. 1 is a diagram illustrating resolution of current limitation achievable in a conventional current limit detector.
Figure 2:
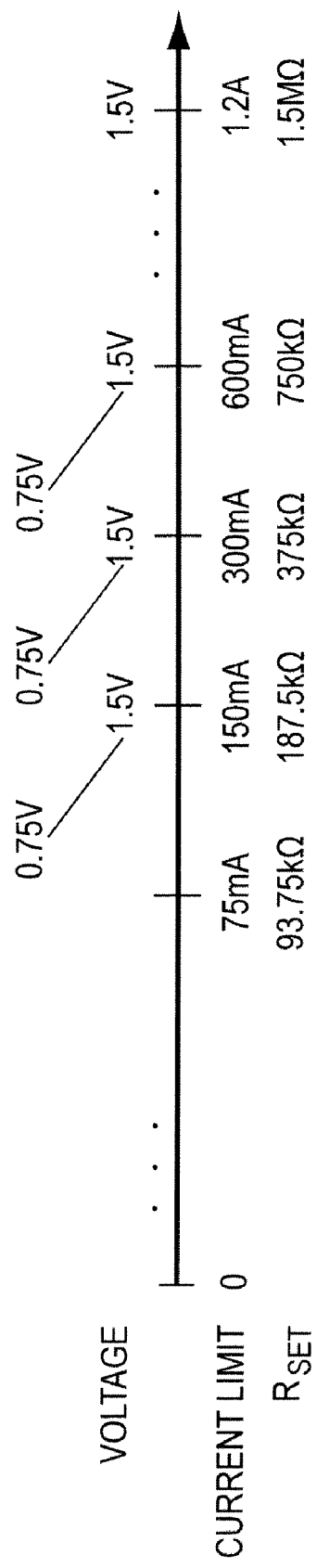
FIG. 2 is a diagram illustrating resolution of current limitation achievable through segmentation, according to one embodiment of the present invention.

One approach to improving accuracy and resolution of a current limit detector in a particular operating voltage range using a single resistive device is to magnify the entire operating voltage range. In one embodiment, as shown in FIG. 2, the operating voltage range is 0.75 V to 1.5 V. The range is divided into multiple segments. In each segment, a user-defined resistive value, $R_{SET}$, is associated with a user-defined current limit. Although there are multiple segments, each with the same operating voltage range, a one-to-one relationship is maintained between the chosen resistive value and the defined current limit.

In a first segment, the system designer has selected a resistive value of 93.75 kΩ to be associated with a current limit of between 75 mA and 150 mA. In a second segment, a resistive value of 187.5 kΩ has been selected to be associated with a current limit of between 150 mA and 300 mA. The resistive values and associated current limits are user-defined and may be chosen according to any scheme so long as there is no overlap between segments, i.e., so long as the one-to-one relationship is maintained between $R_{SET}$ and the current limit. This enables proper transition between segments. In FIG. 2, for each segment, the resistive value as well as the current limit is doubled. In other embodiments, as between segments, the resistive value, the current limit or both may be logarithmically or exponentially related. For example, the first and second segments may include $R_{SET}$ of ln(93750) and ln(187500) Ω, respectively. The associated current limits may be selected according to a logarithmic pattern, any other patterns, or even randomly. By magnifying the operating voltage range, and hence also the operating current range, the resolution and accuracy may be increased.

In operation, typically upon power-up, a load switch device that includes a current limit detector scheme according to FIG. 2 will detect the current limit. Assume, for example, that the resistive value is 1.5 MΩ. At start-up, the current, $I_{SET}$, flowing through the current limit detector may be such that the voltage, $V_{SET}=R_{SET} \times I_{SET}$, is greater than the upper operating voltage, i.e., greater than 1.5 V. If so, the current limit detector may respond by reducing the current, $I_{SET}$. Such reduced current flowing through the current limit detector may nonetheless produce a voltage, $V_{SET}$, across the resistive device that is greater than 1.5 V. If so, the current, $I_{SET}$, may be reduced further. Once the voltage produced is below 1.5 V, the current is not reduced further, because the current limit detector is then operating within the operating voltage range. At such time, the current, $I_{SET}$, indicates what the corresponding current limit is, i.e., based on the relationship between $I_{SET}$ and the current limit, determination of $I_{SET}$ also establishes the current limit. The current limit may, for example, have been programmed into memory within the load switch device. The current limit thus detected may then be communicated to a current limit controller coupled to the current limit detector. The current limit controller may thereafter limit the current to below the current limit and maintain it at or below that level.

The current limit is typically detected once after installation or set-up of the system or device in which the load switch device is incorporated or to which it is otherwise operationally coupled. Thereafter, the current limit is typically not detected anew until power is recycled, for example, when the load switch application is re-started, such as upon power-up, wake-up, and the like. Thereafter, the current limit detector is typically dormant, i.e., not performing its current detection functionality.

Table 1 illustrates the relationship between a resistive value of a resistive device, $R_{SET}$, and a corresponding user-defined current limit. The numbers in Table 1 match those illustrated in FIG. 2. By increasing the resistive value by four orders of magnitude ($2^4$=16), from 93.75 kΩ to 1.5 MΩ, the current limit is likewise increased by a magnitude of four, from 75 mA to 1.2 A.

TABLE 1

Relationship between resistive value and corresponding user-defined current limit.

| Signal | $I_{SET}$ | User-Defined Current Limit | $R_{SET}$ | $V_{SET} = I_{SET} \times R_{SET}$ |
|---|---|---|---|---|
| EN8 = S1 | 1 μA | 1.2 A | 1.5 MΩ | 1.5 V |
|  | 1 μA | 600 mA | 750 kΩ | 0.75 V |
| EN4 = S1 + S2 | 2 μA | 600 mA | 750 kΩ | 1.5 V |
|  | 2 μA | 300 mA | 375 kΩ | 0.75 V |
| EN2 = S1 + S2 + S3 | 4 μA | 300 mA | 375 kΩ | 1.5 V |
|  | 4 μA | 150 mA | 187.5 kΩ | 0.75 V |
| EN1 = S1 + S2 + S3 + S4 | 8 μA | 150 mA | 187.5 kΩ | 1.5 V |
|  | 8 μA | 75 mA | 93.75 kΩ | 0.75 V |

The total detection current, $I_{SET}$, flowing through the load switch device may be changed in one or more steps. The embodiment illustrated in Table 1 allows for step-wise detecting the current limit by step-wise decreasing the total current flowing. Such step-wise detection may be obtained by including multiple current paths in the load switch device, where $I_{SET}$ comprises the sum of the currents flowing on each of the current paths. Also, each current path may include a current switch (e.g., a transistor T1, T2, T3, T4) which can cause the current on that path to start or stop flowing as the respective transistor is turned ON or OFF. The embodiment outlined in Table 1 includes four current paths. The signals to turn ON the transistors (T1, T2, T3, and T4) are denoted S1, S2, S3, and S4, respectively. A state of the load switch device is the status of the signals controlling the transistors, i.e., the set {S1, S2, S3, S4}. An enable signal (EN) defines the state, i.e., which of the individual signals are activated. The current, I1, flowing on the current path whose transistor T1 is controlled by signal S1 is 1 μA. The currents I2, I3, and I4 flowing on the current paths with transistors T2, T3, and T4, respectively, are 1 μA, 2 μA, and 4 μA, respectively.

For example, a first enable signal (EN1) may be defined as S1+S2+S3+S4. When turned ON, the transistors T1-T4 allow the associated current I1-I4 to flow, and when turned OFF, the transistor T1-T4 interrupts the current flowing on the associated current path. Thus, EN1 may cause all four transistors to be turned ON. In this case, the total current of 8 μA consists of a sum of currents I1, I2, I3 and I4 which flow through transistors T1-T4 when turned ON by the signals S1-S4. As noted, the current limits are user defined. If the designer chooses the resistive value, $R_{SET}$, as 93.75 kΩ, the current limit is set, per Table 1, at 75 mA. If the designer chooses the resistive value as 187.5 kΩ, the current limit is set at 150 mA. As noted, the current limits are user defined. The designer may set the current limits, for example, based on one or more applications for the load switch device in which the current limit detector is to be incorporated.

The step-wise current limit detection may be obtained by, in a first step, activating all of S1-S4, causing the total detection current, $I_{SET}$, to initially be 8 μA. Thereafter, in a second step, S4 may be deactivated, causing the total current to be limited to 4 μA (i.e., to I1+I2+I3=1 μA+1 μA+2 μA). In a third step, S3 may be also deactivated, causing the total current to be limited to I1+I2, i.e., 2 μA. Further step-wise decrease may be obtained by deactivating S2 and thereafter S1, causing the current to be decreased to I1 (i.e., 1 μA) and thereafter to 0 μA, to substantially 0 μA (e.g., bias currents alone), or to 0 μA with no bias currents. Other step-wise decreases are possible. Various other sequences of step-wise decreases, and thus step-wise detection of the current limit, are possible. Such step-wise detection may further include various levels of step granularity or current increments.

Another enable signal (EN8) may be defined as S1. Using EN8, only one current path, i.e., I1, can be turned ON and OFF. Thus, the step-wise current limit detection may be limited to two steps. Yet other enable signals may include EN2 defined as S1+S2+S3, and EN4 defined as S1+S2. The number of possibilities of step-wise decreasing the current decreases as the number of signals (Sj, j=1, 2, 3, and 4) included in the enable signal decreases. However, even using EN8, comprising S1 alone, the current may be step-wise limited by first activating S1, causing the current to be limited to 1 μA and thereafter deactivating S1, causing the current to be limited to 0 μA (including no bias currents, as will be further described below).

Typically, an embodiment includes a single resistive device of a single resistive value. Therefore, typically only the parameters in one of the rows of Table 1 are applicable to any one embodiment. Other embodiments are possible. For example, an embodiment may include two or more resistive devices operating in parallel. Such embodiment may allow for a user application to select between the resistive devices via, for example, a select signal output from the user application.

Figure 3A:
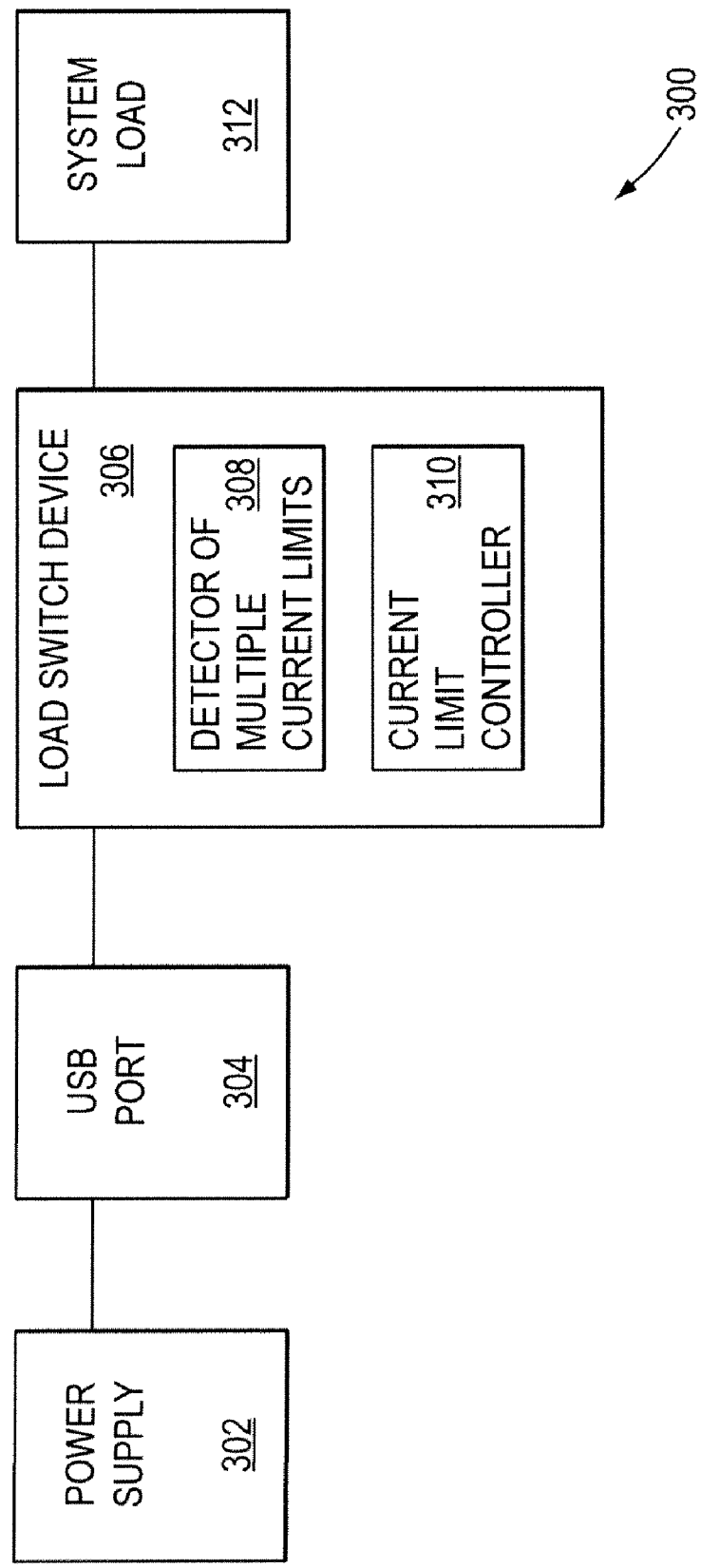
FIG. 3A is a block diagram of a load switch application, according to one embodiment of the present invention.

FIG. 3A is a block diagram showing the implementation of an application 300 with a load switch device 306, according to one embodiment of the invention. As shown, the application 300 includes a power supply 302 operatively coupled, via a universal serial bus (USB) 304, to the load switch device 306. The load switch device 306 is in turn operatively coupled to a system load 312.

The power supply 302 is a device or system adapted to supply electrical energy to the USB port 304. Examples of power supplies 302 include batteries, direct current (DC) power supplies, chemical fuel cells, solar power, and other types of energy storage systems.

The load switch device 306 includes a current limit detector 308 and a current limit controller 310. The current limit detector 308 is operative to detect a current limit using a resistive device. The resistive device may be a resistor or any device capable of providing an electrical resistance (i.e., capable of opposing electrical current). The current limit detector 308 may include one or more comparators, resistors, and current switches (such as transistors) operatively connected and functioning to detect limits on the current. The current limit detector 308 is described in detail with reference to FIGS. 4-7.

The current limit controller 310 is operative to receive the detected current limit from the current limit detector 308 and to limit the current flowing through the load switch device 306. The current limit controller 310 may include a current limit converter, an operational amplifier, a resistor (such as a current sensing resistor), and transistors operatively connected thereto.

The system load 312 may be any device connected to the output of the load switch device 306. Examples of system loads 312 include a PCMCIA card, a compact flash card, and a camera flash LED.

Figure 3B:
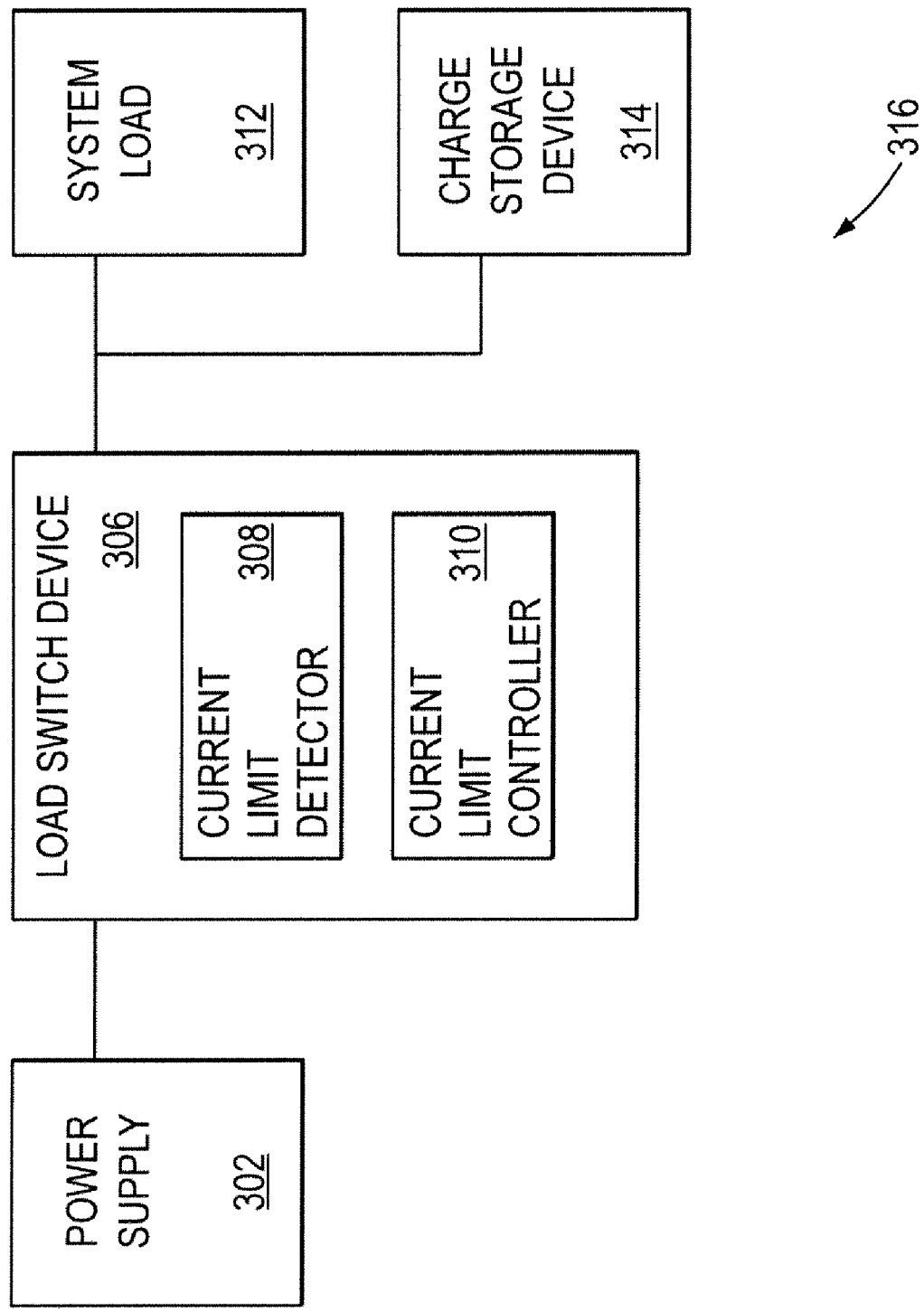
FIG. 3B is a block diagram of another load switch application, according to one embodiment of the present invention.

FIG. 3B is a block diagram of another load switch application 316, according to one embodiment of the present invention. Application 316 includes the power supply 302, the load switch device 306, the system load 312, and a charge storage device 314. The power supply 302 is operatively coupled to the load switch device 306, which is operatively coupled to both the system load 312 and to the charge storage device 314. As in application 300, the load switch device 306 includes the current limit detector 308 and the current limit controller 310.

The charge storage device 314 operates as an energy reservoir adapted to supply burst power. Examples of charge storage devices 314 include boost converters and energy storage devices such as supercapacitors. Generally, a boost converter is a voltage step-up converter that is often regarded as a switching mode power supply. Energy storage devices, unlike boost converters, are based on charge storage and may be used as a power source. A supercapacitor is a type of high-energy storage device designed to be charged and recharged repeatedly and to provide instantaneous high discharge currents with rapid recharge between discharge operations. The charge storage device 314 may also include a combination of boost converter, supercapacitor, and any other type of energy storage device. In some embodiments, the charge storage device 314 may be disposed external to the load switch device 306. For example, it may be detachably coupled to the load switch device 306. In such embodiments, the charge storage device 314 is adapted to cooperate with and to supply burst power to the load switch device 306.

The operation of the load switch device 306, including detecting the current limit by activating current switches in sequence to cause a step-wise reduction in current, is described with reference to FIG. 5.

Figure 4:
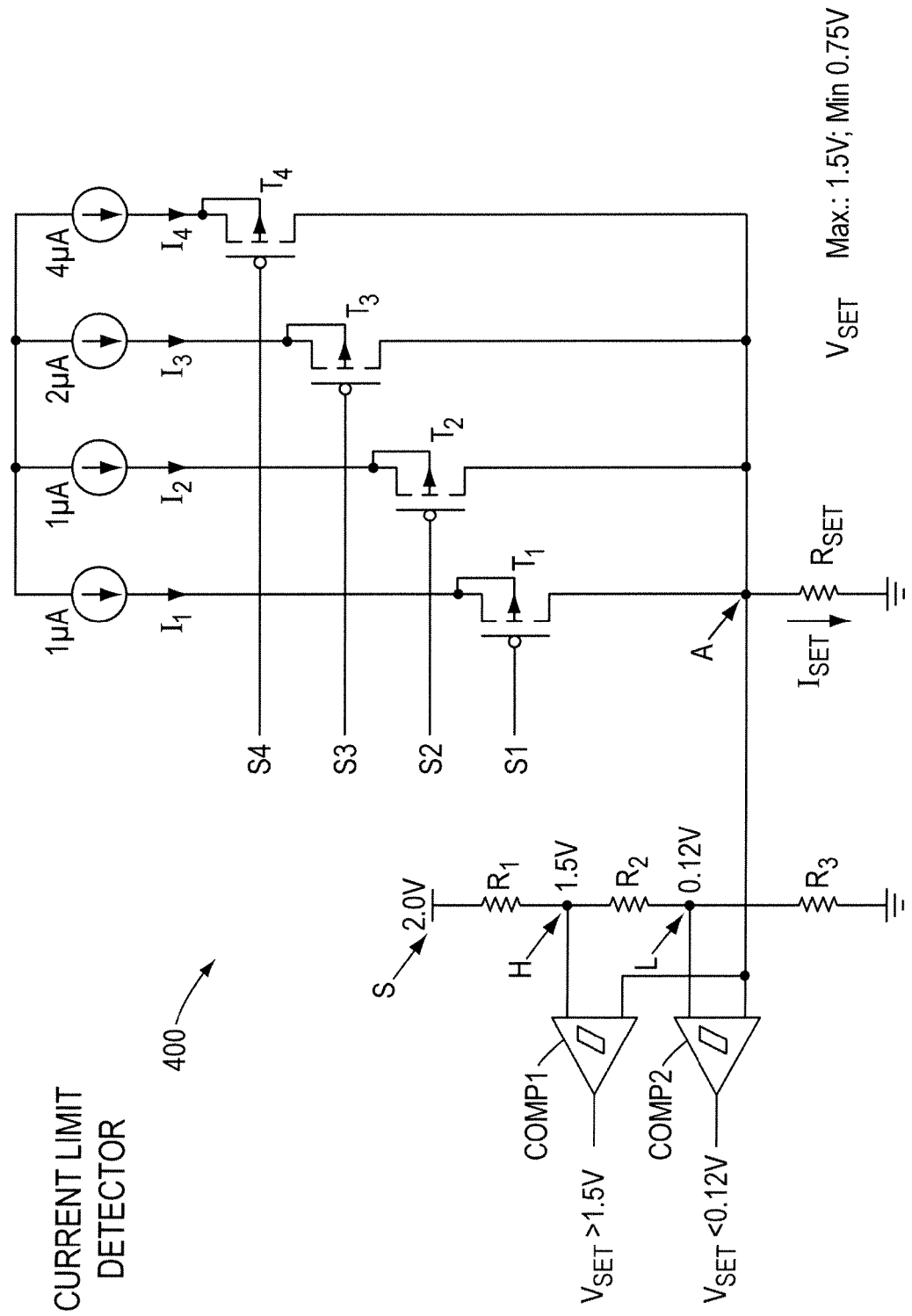
FIG. 4 is a schematic of a current limit detector, according to one embodiment of the present invention.

FIG. 4 is a schematic of a current limit detector 400, according to one embodiment of the present invention. The current limit detector comprises a high-level comparator, COMP1, a low-level comparator, COMP2, a resistive device $R_{SET}$, three resistors R1, R2, and R3, a high reference voltage terminal, H, a low reference voltage terminal, L, a supply terminal, S, a terminal A leading to connection point A, four current switches (e.g., transistors) T1-T4, and four current paths adapted to conduct currents I1-I4, respectively. The supply terminal, S, provides 2.0 V. The values of the resistors R1-R3 are set based on desired threshold voltages at the two reference voltage terminals H and L, relative to the voltage at the supply terminal, S. The method for setting the values of the resistors can be any one of a number of suitable methods, including pre-selecting fixed R value, pre-setting a variable resistor, etc.

In the illustrated embodiment, the high and low threshold voltages are 1.5 V and 0.12 V, respectively. The high reference voltage terminal, H, (at 1.5 V) is operatively coupled to one input of the high-level comparator COMP1. The low reference voltage terminal, L, at 0.12 V is operatively coupled to one input of the low-level comparator COMP 2. Another input of each of COMP1 and COMP2 is operatively coupled to connection point A (or simply "point A") via terminal A.

The outputs of the comparators indicate whether the voltage at point A is within the working voltage range 0.12 V-1.5 V or outside this range. Point A denotes a junction in the current limit detector circuitry where all the current paths meet and at which the currents I1-I4 from all the current paths combine to form the sum, $I_{SET}$, ($I_{SET}$=I1+I2+I3+I4). The resistive device, $R_{SET}$, is connected between terminal A (or point A) and ground. The voltage at terminal A is the voltage drop across the resistive device, i.e., $I_{SET} \times R_{SET}$.

The high-level comparator COMP1 is operative to compare the voltage, $V_{SET}$, at terminal A (point A) with the high threshold voltage 1.5 V and to output a signal responsive to whether $V_{SET}$ exceeds 1.5 V. The low-level comparator COMP2 is operative to compare $V_{SET}$ with the low threshold voltage 0.12 V and to output a signal responsive to whether $V_{SET}$ is below 0.12 V. The output signals from one or both of COMP1 and COMP2 are used to determine which of S1-S4 to activate. As described with reference to Table 1, S1-S4 determine which transistors T1-T4 to turn ON and thus which of currents I1-I4 may flow via the respective current paths. The comparators may be, for example, positive feedback operating amplifiers.

FIG. 4 does not show the details of logic adapted to accept as inputs the outputs from one or both of COMP1 and COMP2 and to generate S1-S4. However, various implementations of such logic are possible and the particulars of such implementations may vary. Such variations may depend, for example, on how the enable signals are defined. In some embodiments, the enable signals may be defined with reference to signals that turn the transistors OFF rather than ON. For example, S1-S4 may denote signals that turn the transistors ON, and S1B-S4B may denote signals that turn transistors T1-T4, respectively, OFF.

In this embodiment, S1 is coupled to and operative to turn ON transistor T1, thereby causing current I1 of 1 μA to flow. Likewise, S2, S3, and S4 are respectively coupled to and operative to turn ON transistors T2, T3, and T4, thereby correspondingly causing currents I2, I3, and I4 of 1 μA, 2 μA, and 4 μA to flow. T1-T4 may include transistors or any other type of current switch. Examples of transistors include field effect transistors (FETs) such as junction FETs (JFETs) and metal oxide semiconductor FETs (MOSFETs), bipolar junction transistors (BJTs), and any combination thereof.

In operation, the current limit detection starts with turning ON all four current paths so that the current, $I_{SET}$, is 8 μA. If, for example, $R_{SET}$ is 1.5 MΩ, the voltage at terminal A, $V_{SET}$, is 12 V (1.5 MΩ×8 μA=12 V), which is above the threshold voltage 1.5 V. The output of COMP1 will be TRUE, because the condition $V_{SET}$>1.5 V is met. The output of COMP2 will also be FALSE, because the condition $V_{SET}$<0.12 V is not met. The output of COMP1 may cause one or more of T1-T4 to be turned ON or OFF, depending on how the enable signal and S1-S4 are defined.

If Table 1 applies, EN1 is defined as S1+S2+S3+S4, and EN2 is defined as S1+S2+S3. This means that the current limit detector responds by deactivating S4 in order to turn OFF T4 and reduce the current, $I_{SET}$, to 4 μA (I1+I2+I3= 1 μA+1 μA+2 μA=4 μA). Following the reduction in $I_{SET}$, the voltage at terminal A, $V_{SET}$, is 6 V (1.5 MΩ×4 μA=6 V) which is still above the threshold voltage 1.5V. The output of COMP1 is still TRUE, and the current limit detector responds by enabling EN4=S1+S2, i.e., by deactivating S3 to turn off T3 and reduce $I_{SET}$ to 2 μA (I1+I2=1 μA+1 μA=2 μA). Following this reduction, $V_{SET}$ is 3 V (1.5 MΩ×2 μA=3 V). The current detector responds again, reducing the current by turning OFF T2 to enable EN8=S1. The resulting current, $I_{SET}$, is 1 μA (I1 alone), which causes $V_{SET}$ to be 1.5V.

At this point, $V_{SET}$ falls within the operating range, and the condition of COMP1 is FALSE. Likewise, the condition of COMP2 is FALSE, because $V_{SET}$ (1.5V) is not <0.12V. According to Table 1, the current limit thus detected is 1.2 A. The current limit detector communicates the current limit of 1.2 A to the current limit controller.

Assuming that $I_{SET}$ is initially 8 µA, if $R_{SET}$ is instead to 200 kΩ, the voltage drop, $V_{SET}$, across the resistive device is 1.6 V. Because this voltage drop exceeds the high threshold, i.e., $V_{SET}$(1.6 V)>1.5 V, the COMP1 output switches to TRUE, and the current is limited to 4 µA. With this lower current, the voltage drop across $R_{SET}$ decreases to 0.8 V (at point A 200 kΩ×4 µA=0.8 V). In response, the COMP1 output may change to FALSE (i.e., return to its former output), because the condition $V_{SET}$>1.5 V becomes FALSE again. To avoid or mitigate oscillations, one or both comparators may use hysteresis. Hysteresis may also be used to avoid or mitigate oscillations due to noise or other forms of interference.

The output of a comparator (e.g., COMP1, COMP2) corresponding to FALSE may be HIGH or LOW depending on the inputs to the comparator being respectively set as +/− or −/+. For example, +/− may correlate to an N-channel transistor (e.g., a PNP-type BJT) and −/+ to a P-channel transistor (e.g., an NPN-type BJT). Other relationships between the comparator output and its inputs are possible.

In some embodiments, one or more current paths may include no current switch. For example, S1 and T1 may be omitted and the current I1 may always flow. However, at least one current path operatively coupled to a current switch is necessary in order to obtain step-wise current limit detection. Some embodiments may be implemented with more or fewer Sj signals and/or with more or fewer current switches and current paths than illustrated in FIG. 4.

Some embodiments may include only a high-level comparator, i.e., COMP1. In such embodiments, the low-level comparator COMP2, the resistor R2, and the low reference voltage terminal may be omitted. In such configurations, there is no current limit in the event of a short circuit event during which, in effect, $R_{SET}$ equals 0Ω to ground. The selection of low threshold voltage for COMP2 may be based on criteria including noise immunity. In the embodiment illustrated in FIG. 4, the low threshold voltage selected for the low-level comparator COMP2 is 0.12 V. In alternative embodiments, another non-zero value may be selected, such as 80 mV. Some level of electronic noise exists in all circuits and devices as a result of thermal noise. Random variations in current or voltage may be caused by random movement of the electrons carrying the current as the electrons are jolted around by thermal energy. This phenomenon may limit the minimum signal level to which a circuit may respond, because some amount of thermal noise may arise in the input circuits. Noise immunity criteria can take into account such phenomena.

In some embodiments, the resistive value may be substantially zero, i.e., $R_{SET}$ is in essence a short circuit. In such embodiments, there is no current limit because a short circuit corresponds to virtually infinite current. Other embodiments may be designed without a resistive device. In such embodiments, an open circuit exists in lieu of $R_{SET}$. The current limit detector may, upon detection of an open circuit, determine that a fixed current limit applies. The fixed current limit may be the highest or the lowest current limit or any other fixed current limit as determined during the design phase of the current limit detector. Because $R_{SET}$ is virtually infinite in an open circuit, in operation, the current limit detector may detect the open circuit as the condition of COMP1 always being TRUE. The current limit detector may then identify the resistor as missing, e.g., to the load switch application. The load switch application may thereupon set the current limit. In other embodiments, the current detector may identify the open circuit and communicate a programmed current limit associated therewith to the current limit controller.

The low threshold voltage, illustrated in FIG. 4 as 0.12 V, may be used for noise immunity purposes. Thus, if the condition for COMP2 is detected as TRUE, the voltage $V_{SET}$ is below 0.12 V and the current limit detector may communicate to the current limit controller that there is no current limit.

Various embodiments may be implemented with different resistive values of the resistive device. An alternative embodiment to that illustrated in FIG. 4 may, for example, include multiple resistive devices in parallel rather than the single resistive device, $R_{SET}$. In such an embodiment, the load switch application may be able to select which of the multiple resistive devices to use. The selection may depend on the nature of the application. For example, a camera flash application may select different resistive values than a PCMCIA card application.

FIG. 5 is an exemplary graph of current output over time with $R_{SET}$ of 1 MΩ as current switches are successively activated, according to one embodiment of the present invention. Graph (a) illustrates how the $I_{SET}$ current decreases step-wise from an initial value of 8 µA. As the individual current switches are turned OFF, one at a time, they cause current on a current path to stop flowing. As described with reference to FIG. 3, S4B is the opposite polarity to S4, and in graph (c) S4B is activated. When S4B is activated, T4 is therefore turned OFF, causing I4 to stop flowing. Currents I1, I2, and I3 continue to flow, causing the total current $I_{SET}$ to be limited to 4 µA (1 µA+1 µA+2 µA). Graph (a) shows $I_{SET}$ dropping to 4 µA.

According to graph (d), S3B is thereafter activated, causing T3 to be turned OFF and I3 to stop flowing. Graph (a) shows $I_{SET}$ dropping to 2 µA (I1+I2=1 µA+1 µA) in response thereto. Graph (e) shows S2B thereafter being activated, causing I2 to stop flowing and $I_{SET}$ (in graph (a)) to drop to 1 µA (i.e., I1).

Note that the embodiment whose operation is illustrated in FIG. 5 omits the current switch for turning the current I1 ON and OFF. Therefore, there is no S1B signal, and the $I_{SET}$ current (I1, i.e., 1 µA) is ON continuously until current OFF (COFF) logic is activated (e.g., applied, inserted). An embodiment of COFF logic is shown in the lower portion of FIG. 6. Some embodiments may include COFF logic operative to indicate that an end of the detect sequence has been reached (i.e., that the detect sequence has completed) and that the current limit detector is dormant. In the illustrated embodiment, the end of the detect sequence is reached when S2B-S4B are all active, i.e., when $I_{SET}$ is 1 µA. Thus, graph (b) (FIG. 5) illustrates that the lower end 1 µA of the current range is detected, causing the COFF logic to be active (e.g., HIGH). COFF logic is operative to turn OFF substantially all of the bias currents in the current limit detector when the current limit detector is dormant. In the illustrated embodiment, the COFF logic is coupled to the I1 current path and operative to turn OFF also I1 of 1 µA. In response, $I_{SET}$ in graph (a) is reduced to a current substantially equal to zero. In other embodiments, all current paths may include current switches operative to turn off the current flowing. In such embodiments, the COFF logic may be operative to turn off substantially all bias currents but not to turn OFF any current paths that do not include a transistor. In such an embodiment (not shown), upon activating the COFF logic, the resulting total current would likewise be substantially zero.

FIG. 5 also illustrates that in order to detect the current limit in steps (other than a single step of simply turning OFF all currents, e.g., via the COFF logic), it is necessary for the load switch device to include at least one current path with a transistor and a corresponding signal SjB (or Sj) controlling whether such transistor is turned ON or OFF.

The current limit detector (e.g., the current limit detector 400 in FIG. 4) may be implemented in a number of ways. One implementation is shown in FIG. 6, which illustrates a current limit detection circuit according to one embodiment of the present invention. As shown, the high-level comparator COMP1 is operatively connected to internal delay elements (denoted FF1-FF3). The delay elements are operatively coupled to each other in series and operative to, serially, maintain a sequence of states. The output of a particular delay element (e.g., FF1) is adapted to cause a change to the state of a delay element that follows it in the series (e.g., FF2). Each state defines which of the one or more transistors are to be turned ON and which are to be turned OFF. The delay elements may be flip-flop registers (FFs). Examples of FFs include D-FFs and JK FFs.

Including the internal delay elements in the current limit detector allows for a comparator (e.g., COMP1, COMP2, or both) to remember a sequence of a length which is based on the number of FFs included. In the illustrated embodiment, the current limit detector includes three FFs (i.e., FF1, FF2, and FF3) operatively coupled to COMP1, and thus the current limit detector is adapted to remember a sequence of length three (with respect to the operation of COMP1). In alternative embodiments, more or fewer delay elements may be included. As the number of delay elements increases, so does the length of the sequences that may be remembered and, in turn, the obtainable current resolution. For example, in an embodiment as defined as in Table 1, the sequence of states allows for a step-wise decrease of $I_{SET}$ from a first state in which 8 μA (all of I1-I4) is flowing to a second state in which 4 μA (I1-I3 but not I4) is flowing and from the second to a third state in which 2 μA (I1 and I2 but not I3 and I4) is flowing.

In a preferred embodiment, the delay elements prevent race conditions. Race conditions may otherwise occur if, for example, the output of one delay element in the series becomes critically dependent on the sequencing and/or timing of other events such as when inputs to logic gates, such as the FFs, vary. For example, the output of FF2 in FIG. 6 depends on the state of its inputs. As the inputs change state, a finite delay may occur before the output changes. For a brief period, the output may change to an unwanted state before settling back to the designed state. In general, certain electronic systems are able to tolerate such glitches. However, if for example the output signal functions as a clock for other elements that contain memory (e.g., FF3), the current limit detector may rapidly depart from its designed behavior. In effect, the temporary glitch may become permanent.

The delay elements advantageously allow for the sequence of state transitions to be clocked. For example, by activating (e.g., enabling) the delay elements in order of operation (i.e., FF1, then FF2, and thereafter FF3), FF1 is not activated until its inputs are stable. FF2 may be activated a short period thereafter, such period being sufficient to allow for the output of FF1 to become stable. Because the output of FF1 also affects the inputs to FF2, the inputs to FF2 are stable when FF2 is activated. Likewise, FF3 may not be activated until its inputs, affected by the output of FF2, are stable. This results in clocking of the sequence resembling a ripple clock. There is thus no need for the current limit detector to include a clock oscillator. After three such clock cycles, the delay elements are stable and the delay enable input (denoted DEX in FIG. 6) is in the OFF state, which disables the delay elements. Other embodiments may include a state machine in lieu of the delay elements. However, the circuitry illustrated in FIG. 6 may be preferred because of its zero dynamic current consumption. In an alternative embodiment, the circuitry denoted 602 may be implemented using a state machine.

FIG. 6 also illustrates an implementation of COFF logic adapted to produce a COFF output signal. Such COFF output signal can be used to turn OFF substantially all bias currents, as described with reference to FIG. 5.

Resistive values, such as the 1.5 V reference voltage, i.e., the high threshold voltage (or state trip point) associated with COMP1, may vary because of resistor tolerance (e.g., of one or more of the resistors R1-R3). Examples of resistor tolerance include 5%, 10%, and more. The threshold voltage value may further vary due to variations in rail voltage (i.e., voltage provided by the supply, such as the power supply unit). Likewise, the 0.12 V reference voltage, i.e., the low threshold voltage, may vary because of resistor tolerance, variations in rail voltage, or both. In the embodiments of FIGS. 4 and 6, the rail voltage is 2.0 V.

Figure 7:
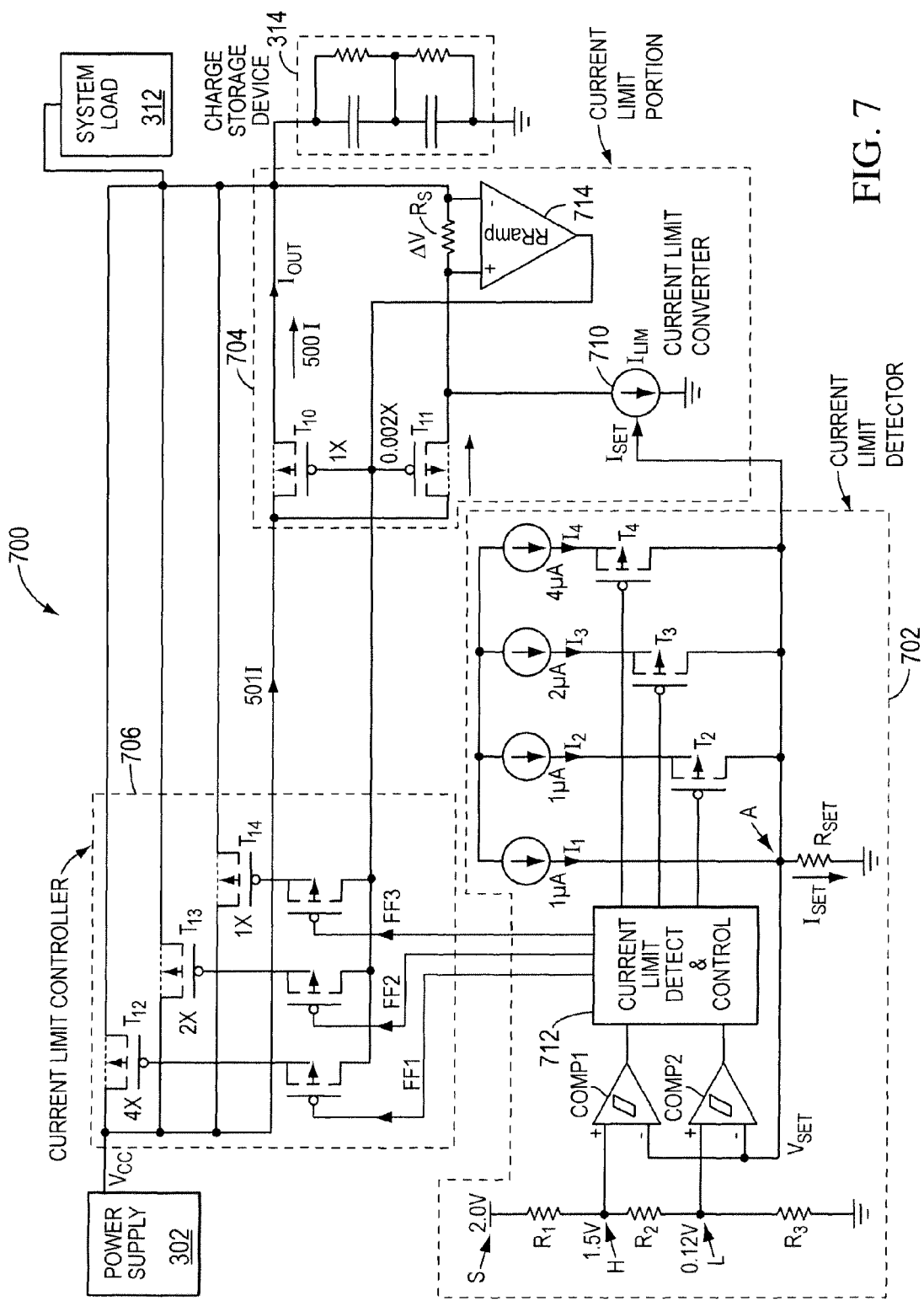
FIG. 7 illustrates circuit details of a load switch device, according to one embodiment of the present invention.

FIG. 7 shows an apparatus 700 for controlling a current limit, including a current limit detector 702, according to one embodiment of the present invention. The apparatus 700 comprises the current limit detector 702, a current limit portion 704, a current limit controller 706, the system load 312, and the charge storage device 314.

The current limit detector 702 is substantially similar to the current limit detector of FIG. 4 or 6, except that, compared to the embodiment of FIG. 4, the current limit detector 702 includes no transistor T1. In the absence of T1, the current I1 always flows. In some embodiments, terminal A is not directly connected to the resistive device but rather to a current limit converter 710 included in the current limit portion 704. The current limit converter 710 is operative to convert voltage to current. The current limit converter 710 may be used to charge circuits as shown in FIG. 7 or any load switch device.

The current limit detect and control component 712 includes the aforementioned delay elements FF1-FF3 of FIG. 6. The current limit controller 706 is operatively coupled to the current limit detect and control component 712, to the current limit portion 704, as well as to the system load 312 and the charge storage device 314. The outputs of the delay elements are fed to the current limit controller 706. In some embodiments, the charge storage device 314 may be external to and adapted to cooperate with the apparatus 700.

The current limit controller 706 is operative to, upon receiving the detected current limit from the current limit detector 702, control the current, $I_{OUT}$, output to the system load 312 and charge storage device 314 so as not to exceed the detected current limit. Such limitation may be performed in a controlled manner, for example, in incremental steps. Such manner may be gradual or fast depending on, for example, the number of delay elements included in the current limit detect and control component 712. The current limit controller 706 may include scaled transistors T12, T13, and T14. In this embodiment, T12 is scaled 4×, T13 is scaled 2×, and T14 is scaled 1×. The size ratio between the scaled transistors may correspond to the respective ratios of the current switches T1-T4. For example, T12 may be scaled 4× corresponding to the scaling of T4 relative to T1 (4 μA vs. 1 μA). Size matching may be important to match transistor criteria, for transistor scaling (i.e., decreasing device dimensions), and the like. Transistors of a particular scale (i.e., size) are typically laid out in the same region on the IC die.

The current limit portion 704 includes the current limit converter 710, an operational amplifier 714, transistors T10 and T11, and a current sensing resistor $R_S$. The transistors T10 and T11 are scaled. In this embodiment, T10 is scaled 1× and T11 is scaled 0.002×. The currents I and $I_{OUT}$ have a substantially fixed ratio between them determined by the size ratio of T10 and T11. In the illustrated embodiment, that size ratio is 500 (1/0.002=500). T11 is thus a current mirror to T10.

If the current, I, flowing through T11 is greater than the current limit, $I_{LIM}$, of the current limit converter 710, the operational amplifier 714 tries to reduce the current until I substantially equals $I_{LIM}$. If I is below $I_{LIM}$, the operational amplifier 714 substantially maintains I at or below $I_{LIM}$. The value of $I_{LIM}$ may be, for example 500×I.

The apparatus 700 or portions thereof, such as the current limit detector (e.g. current limit detector 702 or that illustrated in FIG. 4 or 6), may be implemented in a number of ways. It may be implemented using discrete components or, preferably, it may be embodied in an IC or as a functional block in an IC. Such IC may further be adapted for use in a mobile device. Examples of mobile devices include laptops, cell phones, personal digital assistants (PDAs), game boys, other battery-operated toys, and the like.

In sum, although the present invention has been described in considerable detail with reference to certain preferred versions thereof, other versions are possible. Therefore, the spirit and scope of the appended claims should not be limited to the description of the preferred versions contained herein.

What is claimed is:

1. A system, comprising:
    a plurality of current paths each of which is coupled to an input path, wherein each of the plurality of current paths are adapted to conduct current;
    one or more current switches adapted to interrupt current conduction through at least one of the plurality of current paths;
    the input path configured to receive current not interrupted by the one or more current switches from the plurality of current paths;
    a resistive device of a predetermined resistive value coupled to the input path and adapted to conduct the current not interrupted by the one or more current switches from the plurality of current paths to produce a voltage drop;
    a low reference voltage terminal operative to supply a low threshold voltage;
    a low-level comparator adapted to receive the low threshold voltage from the low reference voltage terminal and the current not interrupted by one or more current switches from the plurality of current paths from the input path, the low-level comparator further adapted to produce a signal, the signal being responsive to a comparison between the voltage drop and the low threshold voltage to operate the one or more current switches; and
    delay elements operatively coupled in series and operative, serially, to maintain a sequence of states, each state defining which of the one or more current switches are to interrupt current conduction through their respective current paths.

2. The system as in claim 1, wherein at least one of the one or more current switches includes a transistor.

3. The system as in claim 1, wherein the resistive device includes a resistor.

4. The system as in claim 1, wherein an amount of the current being conducted on each current path is based on a scale of at least one other current switch of the one or more current switches.

5. The system as in claim 1, wherein the comparison between the voltage drop and the low threshold voltage includes determining whether the voltage drop is lower than the low threshold voltage.

6. The system as in claim 2, further comprising current OFF logic operative to detect that the system is dormant and to turn OFF substantially bias currents of the transistor.

7. The system as in claim 1, wherein the sequence of states is of a length equal to a number of delay elements, at least one of the delay elements being adapted to produce an output for causing a change to the state of a subsequent one of the delay elements in the series.

8. The system as in claim 1, wherein the delay elements include flip-flop registers.

9. The system as in claim 1, wherein each current path is further adapted to conduct current of a specific amount.

10. The system as in claim 1 embodied in an integrated circuit (IC) or as a functional block in the IC.

11. The system as in claim 10, wherein the IC is adapted for use in a mobile device.

12. The system as in claim 1, further comprising:
    a high reference voltage terminal operative to supply a high threshold voltage; and
    a high-level comparator including at least two inputs and an output, one of the two inputs being operative to receive the high threshold voltage and the other one of the two inputs adapted to receive the current not interrupted by the one or more current switches from the plurality of current paths from the input path, the high-level comparator producing at the output a signal responsive to a comparison between the voltage drop and the high threshold voltage.

13. The system as in claim 12, wherein the comparison between the voltage drop and the high threshold voltage includes determining whether the voltage drop is above the high threshold voltage.

14. A system comprising:
    a current limit detector comprising:
        a plurality of current paths each of which coupled to an input path, wherein each of the plurality of current paths are adapted to conduct current;
        a current switch adapted to interrupt current conduction through at least one of the plurality of current paths;
        the input path configured to receive current not interrupted by the current switch from the plurality of current paths;
        a resistive device of a predetermined resistive value coupled to the input path and adapted to conduct the current not interrupted by the current switch from the plurality of current paths to produce a voltage drop;
        a high reference voltage terminal operative to supply a high threshold voltage; and
        a high-level comparator adapted to receive the high threshold voltage from the high reference voltage terminal and the current not interrupted by the current switch from the plurality of current paths from the input path, the high-level comparator further adapted to produce a signal, the signal being responsive to a comparison between the voltage drop and the high threshold voltage to operate the current switch;
    a current limit controller operatively coupled to the current limit detector and operative to step-wise limit an output current based, at least in part, on the signal of the high-level comparator, wherein step-wise limiting the output current includes outputting, at the current limit controller, a sequence of control signals each of which being associated with one step in the step-wise limitation of the output current; and
a current limit portion operatively coupled to the current limit detector and to the current limit controller and operative to regulate the output current in response to the sequence of control signals received from the current limit controller.

15. A system comprising:
a current limit detector comprising:
    a plurality of current paths each of which coupled to an input path, wherein each of the plurality of current paths are adapted to conduct current;
    a current switch adapted to interrupt current conduction through at least one of the plurality of current paths;
    the input path configured to receive current not interrupted by the current switch from the plurality of current paths;
    a resistive device of a predetermined resistive value coupled to the input path and adapted to conduct the current not interrupted by the current switch from the plurality of current paths to produce a voltage drop;
    a high reference voltage terminal operative to supply a high threshold voltage; and
    a high-level comparator adapted to receive the high threshold voltage from the high reference voltage terminal and the current not interrupted by the current switch from the plurality of current paths from the input path, the high-level comparator further adapted to produce a signal, the signal being responsive to a comparison between the voltage drop and the high threshold voltage to operate the current switch;
a current limit controller operatively coupled to the current limit detector and operative to step-wise limit an output current based, at least in part, on the signal of the high-level comparator; and
a charge storage device adapted to cooperate with the current limit controller and to provide an energy reservoir capable of supplying burst power.

16. The system as in claim 14, wherein an amount of the current being conducted on each current path is based on a scale of at least one other current switch.

17. The system as in claim 14, further comprising current OFF logic operative to detect that the system is dormant and to turn OFF substantially bias currents of at least one transistor of the current switch.

18. The system as in claim 14, further comprising:
a low reference voltage terminal operative to supply a low threshold voltage; and
a low-level comparator including at least two inputs and an output, one of the two inputs being operative to receive the low threshold voltage and the other one of the two inputs adapted to receive the current not interrupted by the current switch, the low-level comparator producing at the output a signal responsive to a comparison between the voltage drop and the low threshold voltage,
wherein the current limit controller is operative to step-wise limit the output current based, at least in part, on the signal from the low-level comparator.

19. The system as in claim 15, wherein an amount of the current being conducted on each current path is based on a scale of at least one other current switch.

20. The system as in claim 15, further comprising current OFF logic operative to detect that the system is dormant and to turn OFF substantially bias currents of at least one transistor of the current switch.

21. The system as in claim 15, further comprising:
a low reference voltage terminal operative to supply a low threshold voltage; and
a low-level comparator including at least two inputs and an output, one of the two inputs being operative to receive the low threshold voltage and the other one of the two inputs adapted to receive the current not interrupted by the current switch, the low-level comparator producing at the output a signal responsive to a comparison between the voltage drop and the low threshold voltage,
wherein the current limit controller is operative to step-wise limit the output current based, at least in part, on the signal from the low-level comparator.

22. A method, comprising:
receiving a plurality of currents over a plurality of current paths, respectively, the plurality of current paths each of which being coupled to an input path;
interrupting, with one or more current switches, at least one of the plurality of currents over at least one of the plurality of current paths;
producing a voltage drop from at least one of the plurality of currents not interrupted by the one or more current switches, the voltage drop being produced from the at least one plurality of currents and a predetermined resistive value coupled to the input path;
receiving, at a low-level comparator, a low threshold voltage, from a low reference voltage terminal, and the at least one of the plurality of currents not interrupted by the one or more current switches;
comparing the low threshold voltage to the voltage drop associated with the at least one of the plurality of currents not interrupted by the one or more current switches;
producing a signal based on the comparison of the low threshold voltage to the voltage drop;
operating the one or more current switches using the signal that was based, at least in part, on the comparison of the low threshold voltage to the voltage drop; and
maintaining a sequence of states using delay elements operatively coupled in series, each state defining which of the one or more current switches are to interrupt current conduction through their respective current paths.

23. The method as in claim 22, wherein an amount of the current being conducted on each current path is based on a scale of at least one other current switch of the one or more current switches.

24. The method as in claim 22, further comprising detecting, with current OFF logic, that a system is dormant and turning OFF substantially bias currents of at least one transistor of the current switch.

25. The method as in claim 22, wherein the sequence of states is of a length equal to a number of delay elements, at least one of the delay elements being adapted to produce an output for causing a change to the state of a subsequent one of the delay elements in the series.

26. The method as in claim 22, further comprising:
receiving a high threshold voltage from a high reference voltage terminator, at a high-level comparator including at least two inputs and an output;
receiving the current not interrupted by the current switch;
producing a signal responsive to a comparison of the high threshold voltage and the voltage drop,
wherein operating the one or more current switches is also based, at least in part, on the comparison of the high threshold voltage and the voltage drop.

27. A method, comprising:
receiving a plurality of currents over a plurality of current paths, respectively, the plurality of current paths each of which being coupled to an input path;
interrupting at least one of the plurality of currents over at least one of the plurality of current paths with a current switch;
producing a voltage drop from at least one of the plurality of currents not interrupted by the current switch, the voltage drop being produced from the at least one plurality of currents and a predetermined resistive value coupled to the input path;
receiving, at a high-level comparator, a high threshold voltage from a high reference voltage terminal, and the at least one of the plurality of currents not interrupted by the current switch;
comparing the high threshold voltage to the voltage drop associated with the at least one of the plurality of currents not interrupted by the current switch;
producing a signal based on the comparison of the high threshold voltage and the voltage drop;
step-wise limiting, using a current limit controller, an output current based, at least in part, on the signal based on the comparison of the high threshold voltage and the voltage drop, wherein step-wise limiting the output current includes outputting, at the current limit controller, a sequence of control signals each of which being associated with one step in the step-wise limitation of the output current; and
regulating the output current in response to the sequence of control signals from the current limit controller.

28. The method as in claim 27, wherein an amount of the current being conducted on each current path is based on a scale of at least one other current switch.

29. The method as in claim 27, further comprising detecting, with current OFF logic, that a system is dormant and turning OFF substantially bias currents of at least one transistor of the current switch.

30. The method as in claim 27, further comprising:
receiving a low threshold voltage, from a low reference voltage terminator, at a low-level comparator including at least two inputs and an output;
receiving the current not interrupted by the current switch; and
producing a signal responsive to a comparison of the low threshold voltage and the voltage drop,
wherein step-wise limiting, using the current limit controller, an output current is further based, at least in part, on the signal of the comparison of the low threshold voltage and the voltage drop.

31. A method, comprising:
receiving a plurality of currents over a plurality of current paths, respectively, the plurality of current paths each of which being coupled to an input path;
interrupting at least one of the plurality of currents over at least one of the plurality of current paths with a current switch;
producing a voltage drop from at least one of the plurality of currents not interrupted by the current switch, the voltage drop being produced from the at least one plurality of currents and a predetermined resistive value coupled to the input path;
receiving, at a high-level comparator, a high threshold voltage from a high reference voltage terminal, and the at least one of the plurality of currents not interrupted by the current switch;
comparing the high threshold voltage to the voltage drop associated with the at least one of the plurality of currents not interrupted by the current switch;
producing a signal based on the comparison of the high threshold voltage and the voltage drop;
operating the current switch based, at least in part, on the signal of the high-level comparator;
step-wise limiting, using a current limit controller, an output current based, at least in part, on the signal based on the comparison of the high threshold voltage and the voltage drop; and
supplying burst power from an energy reservoir of a charge storage device adapted to cooperate with the current limit controller.

32. The method as in claim 31, wherein an amount of the current being conducted on each current path is based on a scale of at least one other current switch.

33. The method as in claim 31, further comprising detecting, with current OFF logic, that a system is dormant and turning OFF substantially bias currents of at least one transistor of the current switch.

34. The method as in claim 31, further comprising:
receiving a low threshold voltage, from a low reference voltage terminator, at a low-level comparator including at least two inputs and an output;
receiving the current not interrupted by the current switch; and
producing a signal responsive to a comparison of the low threshold voltage and the voltage drop,
wherein step-wise limiting, using the current limit controller, an output current is further based, at least in part, on the signal of the comparison of the low threshold voltage and the voltage drop.

* * * * *